US007262748B2

(12) United States Patent
Du et al.

(10) Patent No.: US 7,262,748 B2
(45) Date of Patent: Aug. 28, 2007

(54) DRIVING METHOD FOR A PLASMA DISPLAY PANEL

(75) Inventors: Ji-Bin Du, Banchiau (TW); Chung-Kuang Tsai, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 417 days.

(21) Appl. No.: 10/780,789

(22) Filed: Feb. 18, 2004

(65) Prior Publication Data

US 2004/0178972 A1 Sep. 16, 2004

(30) Foreign Application Priority Data

Feb. 20, 2003 (TW) .............................. 92103501 A

(51) Int. Cl.
*G09G 3/28* (2006.01)
*G09G 3/10* (2006.01)
*H01G 1/46* (2006.01)

(52) U.S. Cl. ........................ 345/60; 345/208; 345/690; 345/694; 313/296; 313/585; 315/169.1; 315/169.2; 315/169.3; 315/169.4

(58) Field of Classification Search ............ 345/60–63, 345/66–68, 690, 691, 210, 213, 694; 315/169.1–169.4; 313/296–300, 584, 585
See application file for complete search history.

(56) References Cited

U.S. PATENT DOCUMENTS 6,373,452 B1 * 4/2002 Ishii et al. .................... 345/67
6,512,336 B2 * 1/2003 De Zwart et al. ........ 315/169.3
6,677,714 B2 * 1/2004 Du et al. ................. 315/169.4
6,703,792 B2 * 3/2004 Kawada et al. .......... 315/169.4
6,992,645 B2 * 1/2006 Kim et al. .................... 345/66
7,079,090 B2 * 7/2006 Takeuchi et al. .............. 345/67

* cited by examiner

*Primary Examiner*—Henry N Tran
(74) *Attorney, Agent, or Firm*—Thomas, Kayden, Horstemeyer & Risley

(57) ABSTRACT

A driving method for a plasma display panel (PDP). The odd pixels units are selected by the odd fields, and are discharged. The even pixels units are selected by the even fields, and are discharged. The pixel units are disposed in a triangular arrangement, so that the odd pixel units and adjacent even pixel units, being different in color, are arranged alternately. Thereby, the present invention can eliminate flicker. In addition, the different pixel units are controlled by different common electrodes and the present invention thereby reduces cross-talk.

12 Claims, 7 Drawing Sheets

DRIVING METHOD FOR A PLASMA DISPLAY PANEL

This application claims the benefit of Taiwan application Serial No. 092103501, filed Feb. 20, 2003.

BACKGROUND OF THE INVENTION

1. Field of the Invention

The invention relates in general to a driving method, and in particular, to a driving method for a plasma display panel (PDP).

2. Description of the Related Art

Plasma display panels (PDP), with the characteristics of large display area, wide viewing angle, high resolution and full color display, have received more attention than the cathode ray tube (CRT) in recent years.

FIG. 1 shows a three-dimensional diagram of a plasma display panel (PDP) according to a conventional method. The PDP includes a front substrate 102 and a rear substrate 108. A plurality of transparent electrodes (not shown in the figure) are formed in advance. Then, a plurality of common electrodes X and scanning electrodes Y are arranged alternately and in parallel on the front substrate 102. The common electrodes X and the scanning electrodes Y are covered with a dielectric layer 104. The dielectric layer 104 is covered with a protective layer 106, which is made of magnesium oxide (MgO), such that the common electrodes X, the scanning electrodes Y, and the dielectric layer 104 can be protected. A plurality of addressing electrodes A are positioned in parallel on the rear substrate 108, and are covered with a dielectric layer 116, wherein the direction of the addressing electrode A crosses with that of the common electrodes X and the scanning electrodes Y. A plurality of ribs 112 parallel to the addressing electrodes A are positioned on the rear substrate 108. A fluorescent layer 110 is coated between the adjacent ribs 112 and on the sidewall of the ribs 112.

The space between the front substrate 102 and the rear substrate 108 is called a discharge space and is filled with the discharge gas mixed with Ne and Xe. One common electrode X and one scanning electrode Y on the front substrate 102 and the corresponding addressing electrode A on the rear substrate 108 defines a pixel unit. The plurality of the common electrodes X, the scanning electrodes Y, and the addressing electrodes A commonly define a plurality of pixel units, disposed in the form of a matrix. In the operation of the PDP, the gas in the discharge space is excited, discharged, and then emits UV light. The fluorescence layer 110 absorbs UV light of specified wavelengths and then emits visible light.

FIG. 2 illustrates the arrangement of the pixel units and the arrangement of the electrodes in a PDP according to a conventional method. The pixel units of different colors are formed with different color's fluorescence layer 110. As shown in FIG. 2, the common electrode X1 and the scanning electrode Y1 commonly define a red pixel unit R1, a green pixel unit G1, and a blue pixel unit B1. The scanning electrode Y1 and the common electrode X2 commonly define a red pixel unit R2, a green pixel unit G2, and a blue pixel unit B2. The common electrode X2 and the scanning electrode Y2 commonly define a red pixel unit R3, a green pixel unit G3, and a blue pixel unit B3. The scanning electrode Y2 and the common electrode X3 commonly defines a red pixel unit R4, a green pixel unit G4, and a blue pixel unit B4.

If the PDP displays 60 frames in one second, there will be 30 odd frames and 30 even frames being arranged alternately. Hence, a complete image consists of an odd frame and an even frame. In FIG. 2, the pixel units belonging to the row of odd number (odd pixel units) display in the odd frame, and the pixel units belonging to the row of even number (even pixel units) display in the even frame. The voltage difference between the common electrode X1 and the scanning electrode Y1, and the voltage difference between the common electrode X2 and the scanning electrode Y2 are sequentially larger than a discharge threshold voltage. These two voltage differences are sustained so as to discharge, which facilitates the displays of the odd frames. The voltage difference between the common electrode X2 and the scanning electrode Y1, and the voltage difference between the common electrode X3 and the scanning electrode Y2 are sequentially larger than a discharge threshold voltage. These two voltage differences are sustained so as to discharge, which facilitates the displays of the even frames.

However, the PDP of FIG. 2 has serious problems with flicker, which has two causes. First, the pixel units of the same color are positioned in the same column. Second, the odd pixel units and the even pixel units respectively display in odd frame and even frame.

Moreover, the common electrodes, as well as the scanning electrodes, are used commonly by the two adjacent pixel units. Therefore, the PDP of FIG. 2 has poor image quality due to plasma cross-talk between pixels.

SUMMARY OF THE INVENTION

It is therefore an object of the invention to provide a driving method for a plasma display panel (PDP) with reduced flicker and cross-talk, and accordingly provide a PDP of higher image quality.

The present invention comprises a driving method for a plasma display panel (PDP). The PDP has a plurality of first common electrodes, a plurality of second common electrodes, a plurality of scanning electrodes, a plurality of data electrodes, and a plurality of pixel units. The pixel units belonging to the row of odd number are odd pixel units and are defined by the second common electrodes and the scanning electrodes. The pixel units belonging to the row of even number are even pixel units and are defined by the first common electrodes and the scanning electrodes. The image data of the pixel unit is inputted by the data electrode. First step (a) is implemented. A reset operation is processed in advance. Each of the voltage differences between the second common electrodes and the scanning electrodes is then adjusted to be larger than a discharge threshold voltage during the odd-field address period. Image data is selectively inputted to the data electrodes. Thereupon, step (b) is implemented. A first sustaining discharge pulse and a second sustaining discharge pulse, which are out of phase to each other, are respectively inputted to the scanning electrodes and the second common electrodes during the odd-field sustaining-discharge period. Then, step (c) is implemented. A reset operation is processed in advance. Each of the voltage differences between the first common electrodes and the scanning electrodes is adjusted to be larger than the discharge threshold voltage during the even-field address period. Image data is selectively inputted to the data electrode. Thereupon, step (d) is implemented. A third sustaining discharge pulse and a fourth sustaining discharge pulse, which are out of phase to each other, are respectively inputted to the scanning electrodes and the first common electrodes during the even-field sustaining-discharge period.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 3:
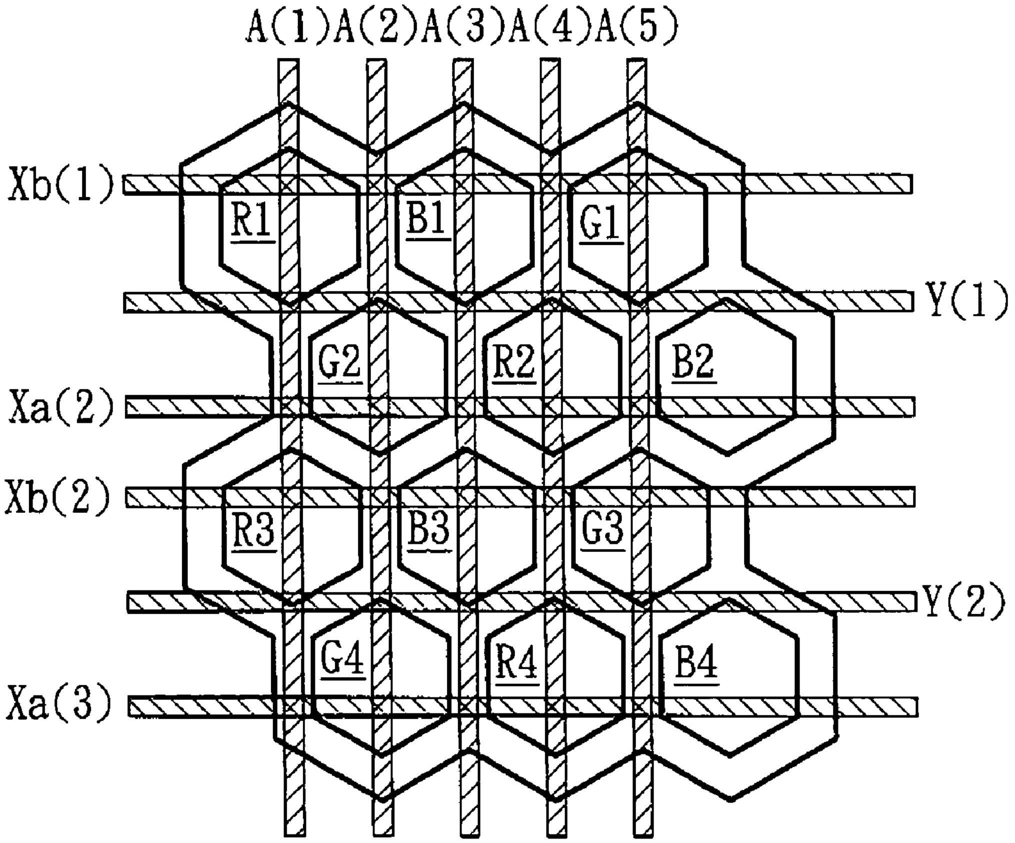
FIG. 3 illustrates the triangle-arrangement of the pixel units for the PDP according to a preferred embodiment of the present invention.

FIG. 3 illustrates the triangle-arrangement of the pixel units for the PDP according to a preferred embodiment of the present invention. The PDP has a plurality of first common electrodes Xa, a plurality of second common electrodes Xb, a plurality of scanning electrodes Y, a plurality of data electrodes A, a plurality of red pixel units R, a plurality of green pixel units G, and a plurality of blue pixel units B. The pixel units belonging to the row of odd number (odd pixel units) are defined by the second common electrodes Xb and the corresponding scanning electrodes Y. The pixel units belonging to the row of the even number (even pixel units) are defined by the first common electrodes Xa and the corresponding scanning electrodes Y. The image data of those pixel units is inputted by the data electrodes A.

For example, the pixel units R1, B1, G1 are controlled by the second common electrode Xb(1) and the scanning electrode Y(1), and the image data of the pixel unit R1, B1, G1 are inputted by the data electrodes A(1), A(3), and A(5). The pixel units R2, B2, G2 are controlled by the first common electrode Xa(2) and the scanning electrode Y(1), and the image data of the pixel units R2, B2, G2 are inputted by the data electrodes A(2) and A(4). The pixel units R3, B3, G3 are controlled by the second common electrode Xb(2) and the scanning electrode Y(2), and the image data of the pixel units R3, B3, G3 are inputted by the data electrodes A(1), A(3), and A(5).

Figure 4:
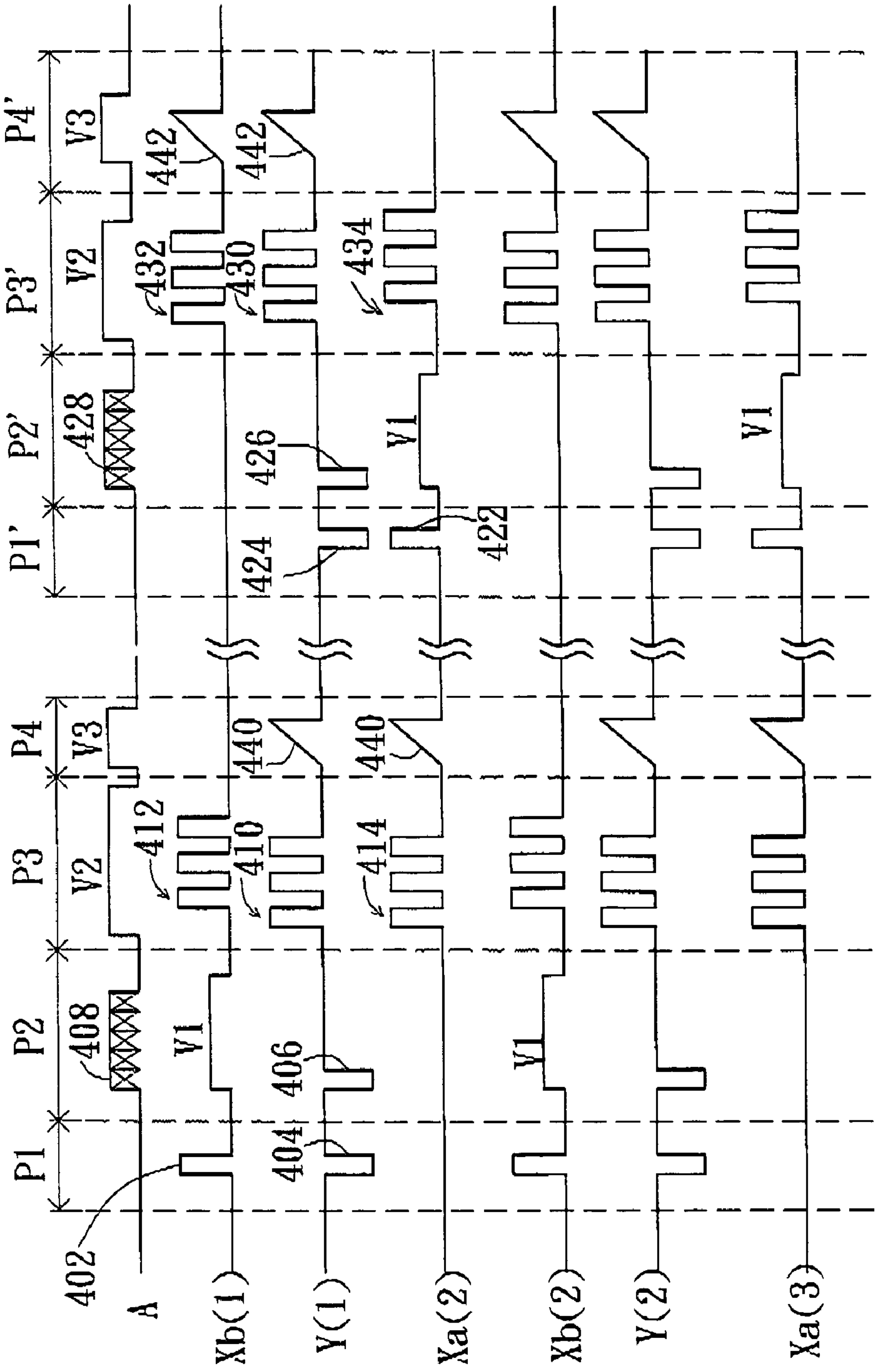
FIG. 4 illustrates the driving sequence for driving the PDP in the form of a timing chart according to one embodiment of the present invention.

FIG. 4 illustrates the driving sequence for driving the PDP in the form of a timing chart according to one embodiment of the present invention. For a PDP displaying N frames in one second, with each frame having M fields, and where M is 10 and N is 60: the M fields are divided into M/2 odd fields and M/2 even fields, wherein the odd fields and the even fields display alternately. Each field includes a reset period, an address period, a sustaining period, and an erase period.

Figure 1:
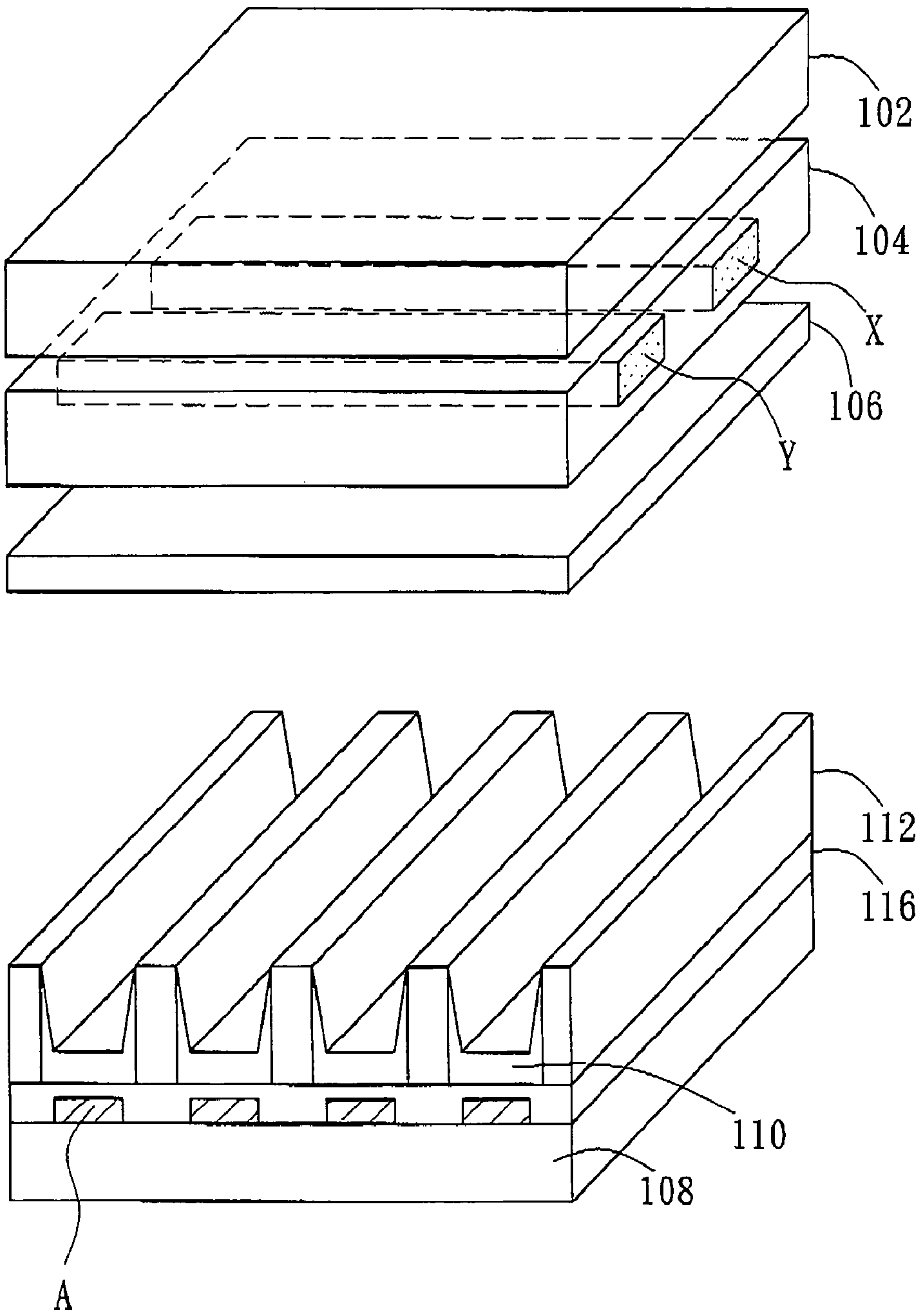
FIG. 1(PRIOR ART)
FIG. 1 (Prior Art) shows a three-dimensional diagram of a plasma display panel (PDP) according to a conventional method.
Figure 2:
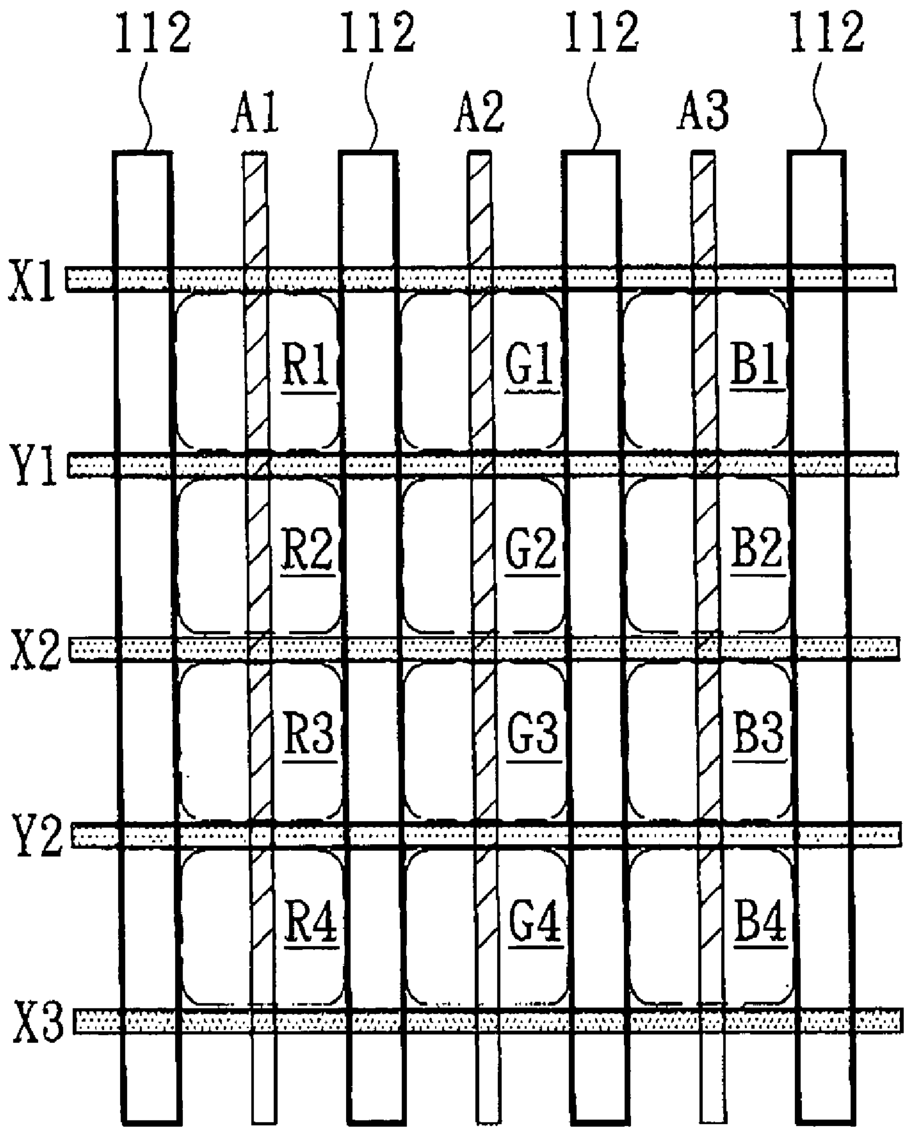
FIG. 2(PRIOR ART)
FIG. 2 (Prior Art) illustrates the arrangement of the pixel units and of the electrodes in a PDP according to a conventional method.

In the present invention, display of the odd fields is achieved by using the odd pixel units, and the display of the even fields is achieved by using the even pixel units. The pixel units are disposed in triangle arrangement so that the adjacent odd pixel units and even pixel units, being different in color, are arranged alternately. As a result, the present invention reduces flicker and cross-talk, as described in the conventional method of FIG. 2.

Figure 7:
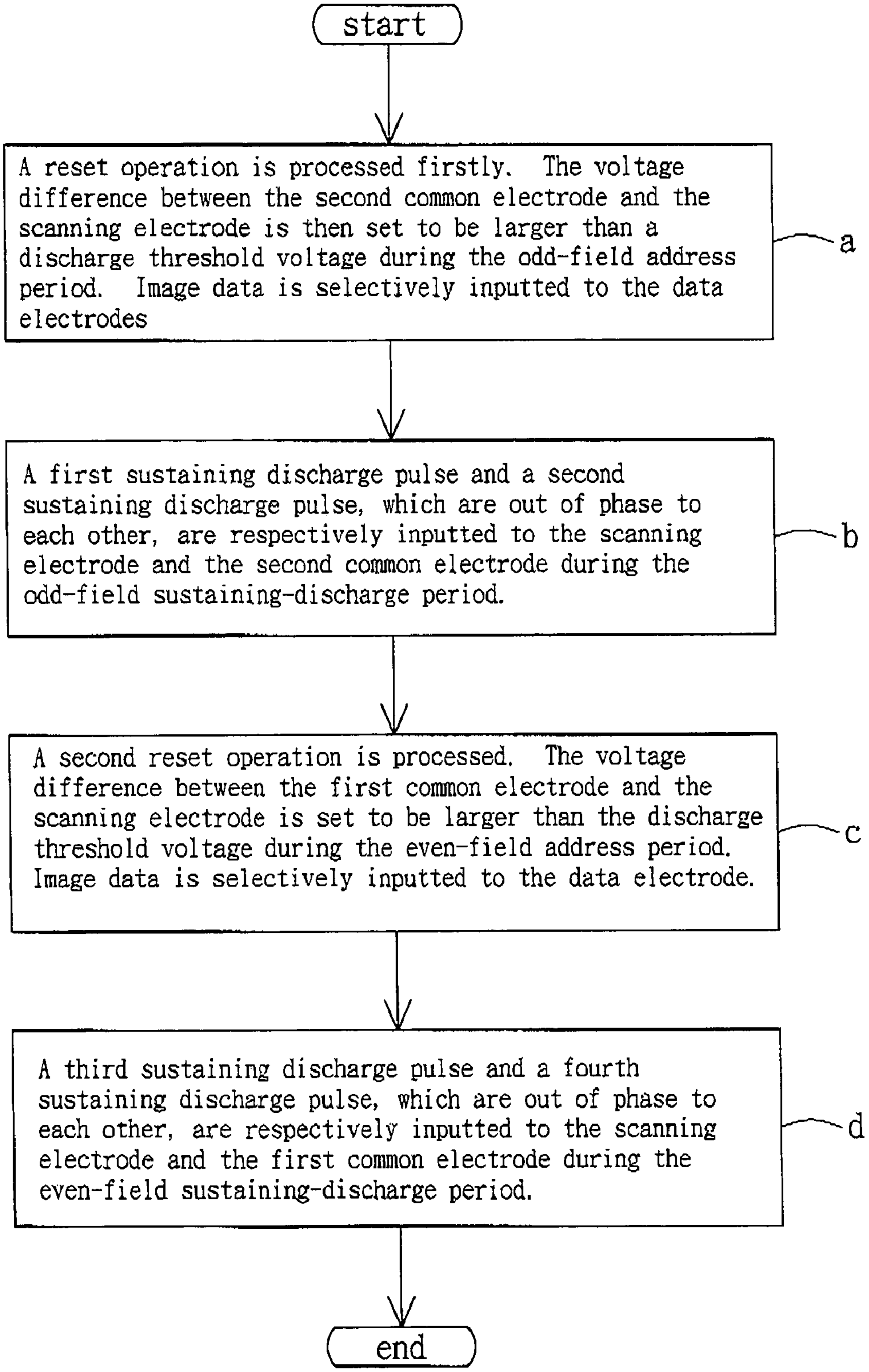
FIG. 7 shows a flow chart of the driving method for the PDP according to the embodiment of the present invention.

Referring to FIG. 7, a flow chart of the driving method for the PDP according to the embodiment of the present invention is shown. First, implement step (a). A reset operation is processed in advance. The voltage difference between the second common electrode Xb and the scanning electrode Y is then adjusted to be larger than a discharge threshold voltage during the odd-field address period P2. Image data is selectively inputted to the data electrodes A. In step (a), the odd pixel units selectively discharge.

Thereupon, implement step (b). A first sustaining discharge pulse and a second sustaining discharge pulse, which are out of phase to each other, are respectively inputted to the scanning electrode Y and the second common electrode Xb during the odd-field sustaining-discharge period P3. In step (b), the selected odd pixel units during the odd-field address period P2 discharge continually.

Then, implement step (c). A reset operation is processed in advance. The voltage difference between the first common electrode Xa and the scanning electrode Y is adjusted to be larger than the discharge threshold voltage during the even-field address period P2'. Image data is selectively inputted to the data electrode A. In step (c), the even pixel units selectively discharge.

Then, implement step (d). A third sustaining discharge pulse and a fourth sustaining discharge pulse, which are out of phase to each other, are respectively inputted to the scanning electrode Y and the first common electrode Xa during the even-field sustaining-discharge period P3'. In step (d), the selected even pixel units during the even-field address period P2' discharge continually.

Referring to FIG. 4, the driving method from step (a) to step (d) will be described specifically as below.

In step (a), a positive voltage 402 and a negative voltage 404 are respectively applied to all the second common electrodes Xb and all the scanning electrodes Y to make each of the voltage differences between all the second common electrodes Xb and all the corresponding scanning electrodes Y larger than a reset threshold voltage during an odd-field reset period P1. Thereby, the odd pixel units, such as the pixel units of R1, B1, G1, R3, B3, and G3 in FIG. 3, are reset.

Then, a first positive voltage V1 is applied and sustained to each of the second common electrodes Xb, and a negative voltage pulse 406 is sequentially applied to all the scanning electrodes Y during the odd-field addressing period P2. Furthermore, a positive voltage pulse 408 is selectively applied to each of the data electrodes A according to the image data to be displayed. Owing to the first common electrode Xa having 0 voltage, the image data is inputted to the odd pixel units. Some wall charges are produced on those pixel units, such as the pixel units R1, B1, G1, R3, B3, and G3 in FIG. 3, and are the initial discharge during the odd-field sustaining-discharge period P3.

In step (b), each of the data electrodes A is sustained in a second positive voltage V2 during the odd-field sustaining-discharge period P3. At the same time, a first sustaining discharge pulse of first alternating-current voltage 410, a second sustaining discharge pulse of a second alternating-current voltage 412, and a third alternating-current voltage 414 are respectively applied to all scanning electrodes Y, all second common electrodes Xb, and first common electrode Xa, wherein the first alternating-current voltage 410 is out of phase to the second alternating-current voltage 412, and is in phase to the third alternating-current voltage 414. Thereby, the odd pixel units, which discharge in the odd-field addressing period P2, continually discharge and emit UV light. The display operation of the pixel units is completed after the fluorescence layer receives the UV light and emits visible light.

In step (c), a positive voltage pulse 422 and a negative voltage pulse 424 are respectively applied to all the first common electrodes Xa and all the scanning electrodes Y to make the voltage difference between all the first common electrodes Xa and all the corresponding scanning electrodes Y larger than a reset threshold voltage during a even-field reset period P1'. Therefore, the even pixel units, such as the pixel units of R2, B2, G2, R4, B4, and G4 of FIG. 3 are reset.

Then, a first positive voltage V1 is applied and sustained to each of the first common electrodes Xa, and a negative voltage pulse 426 is sequentially applied to all the scanning electrodes Y during the even-field addressing-period P2'. Moreover, a positive voltage 428 is selectively applied to all the data electrodes A according to the image data to be displayed. Owing to the second common electrodes Xb having 0 voltage, the image data is inputted to the odd pixel units. Some wall charges are produced on those pixel units, such as the pixel units R2, B2, G2, R4, B4, and G4 of FIG. 3, and will be the initial discharges in the even-field sustaining-discharge period P3'.

In step (d), each of the data electrodes A is sustained in a second positive voltage V2 during the even-field sustaining-discharge period P3'. At the same time, a third sustaining discharge pulse of fourth alternating-current voltage 430, a fifth alternating-current voltage 432, and a fourth sustaining discharge pulse of sixth alternating-current voltage 434 are respectively applied to all scanning electrodes Y, all second common electrodes Xb, and first common electrodes Xa, wherein the fourth alternating-current voltage 430 is out of phase to the sixth alternating-current voltage 434, and is in phase to the fifth alternating-current voltage 432. Thereby, the even pixel units, which discharge in the even-field addressing period P2', continually discharge and emit UV light. The display operation of the even pixel units, such as B2, G2, R2, G4, R4, B4, are completed after the fluorescence layer receives the UV light and emits visible light.

Finally, in order to remove the charges in the discharged pixel unit, there will be respectively an odd-field erase period P4 and an even-field erase period P4' after the odd-field sustaining-discharge period P4 and the even-field sustaining-discharge period P4'. During the odd-field erase period P4, a third positive voltage V3 is applied and sustained to each of the data electrodes A, and an erase pulse 440 is respectively applied to all the scanning electrodes Y and all the first common electrodes Xa. The charges in the odd pixel units can be gradually removed by slowly increasing the voltage difference between the second common electrode Xb and the scanning electrode Y. During the even field erase period P4', the third positive voltage V3 is applied and sustained to each of the data electrodes A, and an erase pulse 442 is respectively applied to all the scanning electrodes Y and all the second common electrodes Xb. The charges in the even pixel units can be gradually removed by slowly increasing the voltage difference between the first common electrode Xa and the scanning electrode Y.

Figure 5:
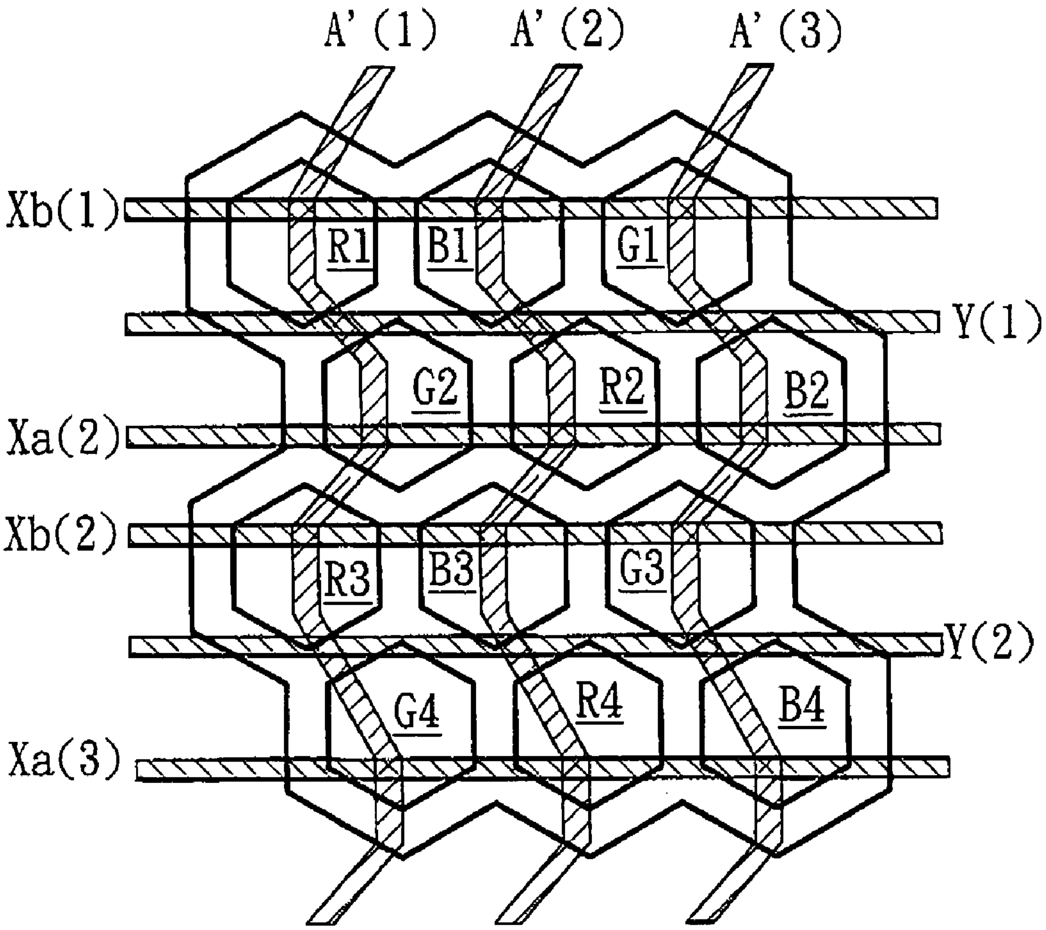
FIG. 5 illustrates the relationship between the electrodes and the pixel units, being disposed in triangle arrangement, according to another preferred embodiment of the present invention.
Figure 6:
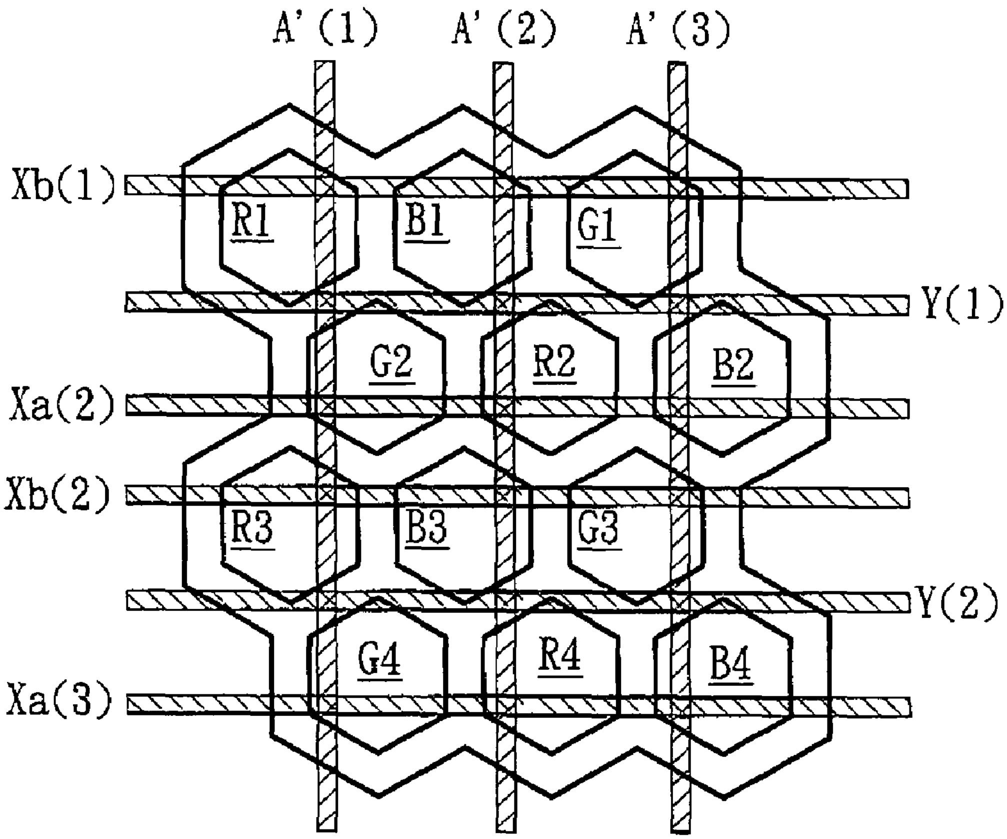
FIG. 6 illustrates the relationship between the electrodes and the pixel units, being disposed in triangle arrangement, according to the other preferred embodiment of the present invention.

The driving method of the present invention can be applied in the condition that the data electrode A' is commonly used by adjacent pixel units, as shown in FIG. 5 and FIG. 6. FIG. 5 illustrates the relationship between the electrodes and the pixel units, being disposed in triangle arrangement, according to another preferred embodiment of the present invention. FIG. 6 shows another preferred embodiment, wherein the data electrodes are respectively bending and straight in shape.

In FIG. 5, each of the odd pixel units and the adjacent even pixel unit use the same data electrode A. For instance, the odd pixel unit R1 and the adjacent even pixel unit G2 commonly correspond to the data electrode A'(1), and the even pixel unit B1 and the adjacent even pixel unit R2 commonly correspond to the data electrode A'(2). When the odd pixel unit is to be displayed, the data electrode A' inputs the image data to the odd pixel unit. When the even pixel unit is to be displayed, the data electrode A' inputs the image data to the even pixel unit. Comparing to the arrangement in FIG. 3, the number of the data electrodes A' in FIG. 5 is nearly half thereby greatly reducing the driving circuit of the data electrode A'.

From the above description, the driving method of present invention improves the image quality of the PDP by reducing flicker and cross-talk.

While the invention has been described by way of example and in terms of the preferred embodiment, it is to be understood that the invention is not limited to the disclosed embodiment. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A driving method for a plasma display panel (PDP), said PDP comprising a plurality of first common electrodes, a plurality of second common electrodes, a plurality of scanning electrodes, a plurality of data electrodes, and a plurality of pixel units, wherein the pixel units belonging to a row of odd number are odd pixel units and are defined by said second common electrodes and said scanning electrodes, the pixel units belonging to a row of even number are even pixel units and are defined by said first common electrodes and said scanning electrodes, wherein said pixel units are disposed in a delta arrangement, and said odd pixel units and said even pixel units are arranged alternately, and image data of said pixel units is inputted by said data electrodes, said driving method comprising:

(a) processing a reset operation, providing an odd-field address period and sequentially making each of voltage differences between said second common electrodes and the corresponding scanning electrodes larger than a discharge threshold voltage, and selectively inputting the image data to said data electrodes;

(b) providing an odd-field sustaining-discharge period, and inputting a first sustaining discharge pulse and a second sustaining discharge pulse, which are out of phase to each other, respectively to said scanning electrodes and said second common electrodes;

(c) processing the reset operation, providing an even-field address period and sequentially making each of voltage differences between said first common electrodes and said scanning electrodes larger than the discharge threshold voltage, and selectively inputting the image data to said data electrodes; and (d) providing an even-field sustaining-discharge period and inputting a third sustaining discharge pulse and a fourth sustaining discharge pulse, which are out of phase to each other, respectively to said scanning electrodes and said first common electrodes.

2. The driving method according to claim 1, wherein said step (a) further comprising:

(a1) making each of the voltage differences between said second common electrodes and said corresponding scanning electrodes larger than a reset threshold voltage; and (a2) sustaining a first positive voltage to each of said second common electrodes, and sequentially applying a negative voltage pulse respectively to each of said scanning electrodes, and selectively applying a positive voltage pulse to each of said data electrodes according to the image data to be displayed.

3. The driving method according to claim 1, wherein said step (b) further comprising:

sustaining a second positive voltage to each of said data electrodes, applying a first alternating-current voltage, a second alternating-current voltage, and a third alternating-current voltage respectively to each of said scanning electrodes, each of said second common electrodes, and each of said first common electrodes, wherein said first alternating-current voltage is out of phase to said second alternating-current voltage, and is in phase to said third alternating-current voltage.

4. The driving method according to claim 1, wherein said step (c) further comprising:

(c1) making each of the voltage differences between said first common electrodes and said corresponding scanning electrodes larger than a reset threshold voltage; and (c2) sustaining a first positive voltage to each of said first common electrodes, and sequentially applying a negative voltage pulse respectively to each of said scanning electrodes, and selectively applying a positive voltage pulse to each of said data electrodes according to the image data to be displayed.

5. The driving method according to claim 1, wherein said step (d) further comprising:

sustaining a second positive voltage to each of said data electrodes, applying a fourth alternating-current voltage, a fifth alternating-current voltage, and a sixth alternating-current voltage respectively to each of said scanning electrodes, each of said second common electrodes, and each of said first common electrodes, wherein said fourth alternating-current voltage is out of phase to said sixth alternating-current voltage, and is in phase to the fifth alternating-current voltage.

6. The driving method according to claim 1, after said step (b) and before said step (c) further comprising:

providing an odd-field erase period for sustaining a third positive voltage to each of said data electrodes, and applying an erase pulse respectively to each of said scanning electrodes and said first common electrodes.

7. The driving method according to claim 1, after said step (d) further comprising:

providing an even-field erase period for sustaining a third positive voltage to each of said data electrodes, and applying an erase pulse respectively to each of said scanning electrodes and said second common electrodes.

8. The driving method according to claim 1, wherein each of said odd pixel units and the adjacent even pixel units correspond to a same data electrode.

9. A driving method for a plasma display panel (PDP), said PDP having a plurality of first common electrodes, a plurality of second common electrodes, a plurality of scanning electrodes, a plurality of data electrodes, and a plurality of pixel units disposed in delta arrangement, wherein the pixel units belonging to a row of odd number are odd pixel units and are defined by said second common electrodes and said scanning electrodes, the pixel units belonging to a row of even number are even pixel units and are defined by said first common electrodes and said scanning electrodes, and image data of said pixel units is inputted by said data electrodes, said method comprising:

(a) making each of voltage differences between said second common electrodes and the corresponding scanning electrodes larger than a discharge threshold voltage;

(b) sustaining a first positive voltage to each of the second common electrodes, sequentially providing a first pulse of a negative voltage respectively to each of said scanning electrodes, and selectively applying a second pulse of a positive voltage to each of said data electrodes according to the image data to be displayed;

(c) sustaining a second positive voltage to each of said address electrode, applying a first alternating-current voltage, a second alternating-current voltage, and a third alternating-current voltage respectively to each of said scanning electrodes, each of said second common electrodes, and each of said first common electrodes, wherein said first alternating-current voltage is out of phase to said second alternating-current voltage, and is in phase to said third alternating-current voltage;

(d) making each of the voltage differences between said first common electrodes and the corresponding scanning electrodes larger than the reset threshold voltage;

(e) sustaining a third positive voltage to each of said first common electrodes, and sequentially applying a third pulse of a negative voltage respectively to each of said scanning electrodes, and selectively applying a fourth pulse of positive voltage to said data electrodes according to the image data to be displayed;

(f) sustaining a fourth positive voltage to each of said data electrodes, applying a fourth alternating-current voltage, a fifth alternating-current voltage, and a sixth alternating-current voltage respectively to each of said scanning electrodes, each of said second common electrodes, and each of said first common electrodes, wherein said fourth alternating-current voltage is out of phase to said sixth alternating-current voltage, and is in phase to the fifth alternating-current voltage.

10. The driving method according to claim 9, wherein each of said odd pixel units and the adjacent even pixel units correspond to a same data electrode, and said odd pixel units and said even pixel units are arranged alternately.

11. The driving method according to claim 9, after said step (c) and before said step (d) further comprising:

providing an odd-field erase period for sustaining a fifth positive voltage to each of said data electrodes, and applying an erase pulse respectively to each of said scanning electrodes and said first common electrodes.

12. The driving method according to claim 9, after said step (f) further comprising:

providing an even odd-field erase period for sustaining a fifth positive voltage to each of said data electrodes, and applying an erase pulse respectively to each of said scanning electrodes and said second common electrodes.

* * * * *